US008626641B1

(12) United States Patent  
Merk (10) Patent No.: US 8,626,641 B1  
(45) Date of Patent: Jan. 7, 2014

(54) DELIVERABLE COMMODITY INVESTMENT VEHICLE

(71) Applicant: Merk Investments LLC, Palo Alto, CA (US)

(72) Inventor: Alexander Merk, Palo Alto, CA (US)

(73) Assignee: Merk Investments LLC, Palo Alto, CA (US)

( * ) Notice: Subject to any disclaimer, the term of this patent is extended or adjusted under 35 U.S.C. 154(b) by 0 days.

(21) Appl. No.: 13/839,463

(22) Filed: Mar. 15, 2013

(51) Int. Cl.
*G06Q 40/00* (2012.01)

(52) U.S. Cl.
USPC .............................................. 705/37; 705/38

(58) Field of Classification Search
USPC ...................................................... 705/35–40
See application file for complete search history.

(56) References Cited

U.S. PATENT DOCUMENTS

| | | | |
|---|---|---|---|
| 5,983,207 A | 11/1999 | Turk et al. | |
| 6,493,683 B1 | 12/2002 | David et al. | |
| 6,907,402 B1 | 6/2005 | Khaitan | |
| 7,206,763 B2 | 4/2007 | Turk | |
| 7,433,842 B2 | 10/2008 | Toffey | |
| 7,496,531 B1 * | 2/2009 | Gastineau et al. | 705/35 |
| 7,739,186 B1 | 6/2010 | Gerber | |
| 7,831,477 B2 | 11/2010 | Woolston | |
| 7,844,547 B2 | 11/2010 | Amos | |
| 7,937,316 B2 | 5/2011 | Friedman et al. | |
| 8,015,089 B1 | 9/2011 | Baya et al. | |
| 8,019,675 B1 * | 9/2011 | Gerber | 705/37 |
| 8,326,720 B2 | 12/2012 | Spirgel et al. | |
| 2007/0239584 A1 | 10/2007 | Fross et al. | |
| 2009/0119230 A1 * | 5/2009 | Levin et al. | 705/36 R |
| 2010/0306096 A1 | 12/2010 | Gorman | |
| 2011/0258102 A1 | 10/2011 | Blasi | |
| 2012/0036059 A1 | 2/2012 | Ionascu et al. | |
| 2012/0066095 A1 | 3/2012 | Wolter et al. | |

OTHER PUBLICATIONS

"Welcome to SPDR Gold Shares", SPDR Gold Shares, Accessed on Mar. 10, 2013, www.spdrgoldshares.com/usa/.
"Why Sprott Bullion Trusts", Sprott Physical Bullion Trusts, Accessed on Mar. 10, 2013, sprottphysicalbullion.com/why-sprott-physical-bullion-trusts/.
Fact Sheet, ETFS Physical Swiss Gold Shares (SGOL), Dec. 31, 2012.
Form 10-K, ETFS Gold Trust, Accessed on Mar. 10, 2013, www.sec.gov/Archives/edgar/data/1450923/000145092313000002/sgol-20121231x10k.htm.
Form 10-k, SPDR Gold Trust, Accessed on Mar. 10, 2013, www.sec.gov/Archives/edgar/data/1222333/000119312512483778/d413553d10k.htm.
Form F-1, APMEX Physical—1 oz. Gold Redeemable Trust, As Filed with the Securities and Exchange Commission on Dec. 23, 2011.

(Continued)

*Primary Examiner* — Thu Thao Havan
(74) *Attorney, Agent, or Firm* — The Mueller Law Office, P.C.

(57) ABSTRACT

A supply of a commodity is owned by an investment vehicle. A sponsor of the investment vehicle receives a delivery application. A custodian stores the supply of the commodity as a collection of first physical units. A commodity dealer specializing in trading the commodity agrees to conduct trades with the sponsor to convert a first quantity of the supply for a second quantity of the commodity. A broker dealer trades shares of the investment vehicle. The delivery application is provided by a shareholder, and specifies a physical format for the second quantity of the commodity.

20 Claims, 5 Drawing Sheets

(56) References Cited

OTHER PUBLICATIONS

Form F-1, Sprott Physical Gold Trust, Accessed Mar. 10, 2013, www.sec.gov/Archives/edgar/data/1477049/000104746910005344/a2198798zf-1.htm.

Form S-1, Market Vectors Redeemable Gold Trust, As Filed with the Securities and Exchange Commission on Mar. 4, 2013, Accessed Mar. 10, 2013, www.sec.gov/Archives/edgar/data/1570765/000093041313001409/c72893_s1.htm.

Home Page, Sprott Physical Bullion Trusts, Accessed on Mar. 10, 2013, sprottphysicalbullion.com.

iShares Gold Trust, Form 10-K for iShares Gold Trust, Accessed Mar. 10, 2013, www.sec.gov/Archives/edgar/data/1278680/000119312513084326/d454111d10k.htm.

Key Information, SPDR Gold Shares, Accessed on Mar. 10, 2013, www.spdrgoldshares.com/usa/key-information/.

Permanent Portfolio Prospectus, May 30, 2012.

Press Release: APMEX Physical—1 oz. Gold Redeemable Trust Files Registration Statement and Prelimnary Prospects, Yahoo Finance, May 22, 2012, Accessed on Mar. 10, 2013, finance.yahoo.com/news/apmex-physical-1-oz-gold-100000010.html.

Prospectus, ETFS Gold Trust, Apr. 13, 2011.

Prospectus, iShares Gold Trust, Nov. 14, 2012.

* cited by examiner

DELIVERABLE COMMODITY INVESTMENT VEHICLE

BACKGROUND OF THE INVENTION

Commodities provide an appealing investment class for conscientious investors that are interested in diversifying their portfolio. Unlike equities, bonds, and currencies, commodities do not run the risk of default as they have intrinsic value. Gold, for example, is one of the most ancient and reliable store houses of value known to humankind. Furthermore, commodity prices exhibit one of the hallmarks of investor diversification as changes in their prices may counteract changes in the value of other asset classes. As such, commodities may be considered a safe haven investment, means of diversifying an investment portfolio, and hedge against inflation.

The key drawback to commodities as an investment is the fact that their physical nature makes them somewhat incompatible with the speed and interconnectivity of the modern financial system. As a result, a common substitute for direct investment in a commodity was to invest in equities associated with producers of that commodity. For example, an investor interested in investing in gold would invest in gold mining companies. However, this solution partly defeats the purpose of investing in commodities in the first place because an investor is then exposed to an array of other risks, including the risk of the producers defaulting; as such, the use of the investment as a diversifier is thereby somewhat mitigated. Institutional investors have also been able to invest in commodities through access to more complex financial products, including financial derivatives, such as futures; however, these financial products have not been traditionally available to retail investors. Ordinary retail investors have historically been prevented from investing directly in commodities.

Recently, financial products that allow retail investors to invest in gold directly have become more readily available through the use of securitized pools of gold. Through securitization, the value of a commodity can be disassociated with the physical nature of the commodity. Shares of a pool of the commodity can be traded so that a transfer of the shares is the legal equivalent of the transfer of a physical portion of that common pool from one party to another. These financial products, such as the Merk Gold Trust, show significant promise for enabling the retail investors of the world to invest in commodities as a pure asset class—wholly distinct from equities and bonds. However, financial products in this class can exhibit significant drawbacks that prevent them from reaching their full potential.

The financial products at issue have at least three main drawbacks. First, they are plagued by the fact that taking delivery of a commodity is prohibitively expensive and is in some cases completely impossible. This is not a trivial problem. If a user is not able to take possession of the commodity in the pool, their ownership of the commodity may be considered a legal fiction. No matter how strongly that fiction may be enforced, it is not true money-in-the-hand ownership. Second, the investment vehicles holding commodities generally store commodities using a format that is incompatible with how a retail investor would prefer to hold the commodity. Taking gold as an example, the commodity here is stored in the institutional system in the form of London Good Delivery Bars which are irregular in terms of both size and purity. It is therefore difficult for a retail investor to serve as an adequate custodian of these bars, and the liquidity of the bars drops precipitously when they are removed from the institutional system. When the bars are input into the institutional system, their weight and purity is determined and guaranteed, and that guarantee attaches to the bar as it is transferred from one institution to the next; the industry refers to this as the "Chain of Integrity". The same is not true for individual investors, which is why standardized coins or bars are preferred. Third, without the ability to take delivery of the gold, retail investors may never be convinced that the pools they are investing in actually have the commodity they say they do. To the extent large institutions can take delivery of gold, custodians of pools of commodity usually only deliver the commodity "unallocated" which means that ownership is not assigned to a specific physical unit, raising questions as to whether stake holders in the administration of investment vehicles holding commodities are keeping adequate track of the perceived and actual amount of the commodity in the pool. Not only that, but unallocated commodities again have counterparty risk, as they represent a claim against the institution holding the commodity, not an ownership of the commodity itself; the institution might, in turn, lease out the commodity, which is why unallocated gold, for example, is also referred to as "paper gold", as well as have numerous institution-specific liabilities. In the case of gold, only gold held on a segregated, "allocated" basis is an ownership claim of a specific gold bar. Such pools might have their commodity holdings audited; but without the ability to take delivery of the commodity, such audits do not necessarily alleviate the concern of investors that the commodity is indeed held by the pool.

SUMMARY OF INVENTION

In one embodiment of the invention, a system is provided for delivering a commodity to a delivery applicant. The system includes a trust for issuing shares that represent an interest in the trust, and for owning a supply of the commodity. The system also includes a trust custodian account for storing at least a portion of the supply where the supply has a first physical composition. The system also includes a commodity dealer account for conducting over-the-counter trades with the trust custodian account. The over-the-counter trades convert the first quantity of the supply in the trust custodian account to a second quantity of the commodity. The delivery application form is used by the delivery applicant shareholder to selectively define a conversion specification that defines a physical composition for the second quantity.

In another embodiment of the invention, a system is provided for receiving a fee for providing a conversion of a commodity. The system includes a supply of a commodity owned by an investment vehicle that is configured to be owned by a shareholder. The system also includes a sponsor for establishing the investment vehicle, collecting the fee, and receiving a delivery application. The system also includes a custodian for storing the supply of the commodity that is stored as a collection of first physical units. The system also includes a commodity dealer specializing in trading the commodity that has agreed to conduct trades with the sponsor to convert a first quantity of the supply for a second quantity of the commodity. The system also includes a broker dealer for trading shares of the investment vehicle. The delivery application is provided by the shareholder, and specifies a physical format for the second quantity of the commodity. The fee is collected from the shareholder after the shareholder completes the delivery application.

In another embodiment of the invention, a method is provided. The method includes arranging for the creation of a trust that has shares that reflect a performance price of a commodity less the operation expenses of the trust. The commodity is stored by a custodian and the shares are traded by a broker. The method also includes reviewing a delivery application that is provided by a delivery applicant and contains a commodity delivery specification. The method also includes pre-approving the delivery application. The method also includes coordinating with a commodity dealer to fulfill the commodity delivery specification. The method also includes arranging for the delivery of a customer commodity delivery to the delivery applicant that matches the commodity delivery specification. After the pre-approving step of the method, the custodian transacts with the commodity dealer to convert the commodity to the customer commodity delivery.

DETAILED DESCRIPTION OF THE EMBODIMENTS

Reference now will be made in detail to embodiments of the disclosed invention, one or more examples of which are illustrated in the accompanying drawings. Each example is provided by way of explanation of the present technology, not as a limitation of the present technology. In fact, it will be apparent to those skilled in the art that modifications and variations can be made in the present technology without departing from the spirit and scope thereof. For instance, features illustrated or described as part of one embodiment may be used with another embodiment to yield a still further embodiment. Thus, it is intended that the present subject matter covers all such modifications and variations within the scope of the appended claims and their equivalents.

The invention relates generally to systems and methods for investing in commodities, and more specifically to commodity investment vehicles offering a conversion or delivery feature.

On Apr. 20, 2012, the assignee of the present application at the time of filing—Merk Investments LLC—filed an S-1 with the SEC registering a financial product. The exact name of the registrant in that filing was: Merk Gold Trust. The contents of this document is incorporated herein by reference in their entirety.

Embodiments of the present invention provide a deliverable commodity investment vehicle. An investment vehicle including both the securitization of a commodity, and the option to take physical delivery of that commodity on demand on any business day, will provide owners with both a convenient and liquid method of investing in a commodity, while at the same time providing the greater certainty accompanying actual physical ownership. If delivery includes the ability to convert the commodity into a different—and more desirable—format, problems with the lack of compatibility of the institutional and retail markets for commodities can likewise be alleviated. Embodiments disclosed herein provide these and other benefits.

Figure 1:
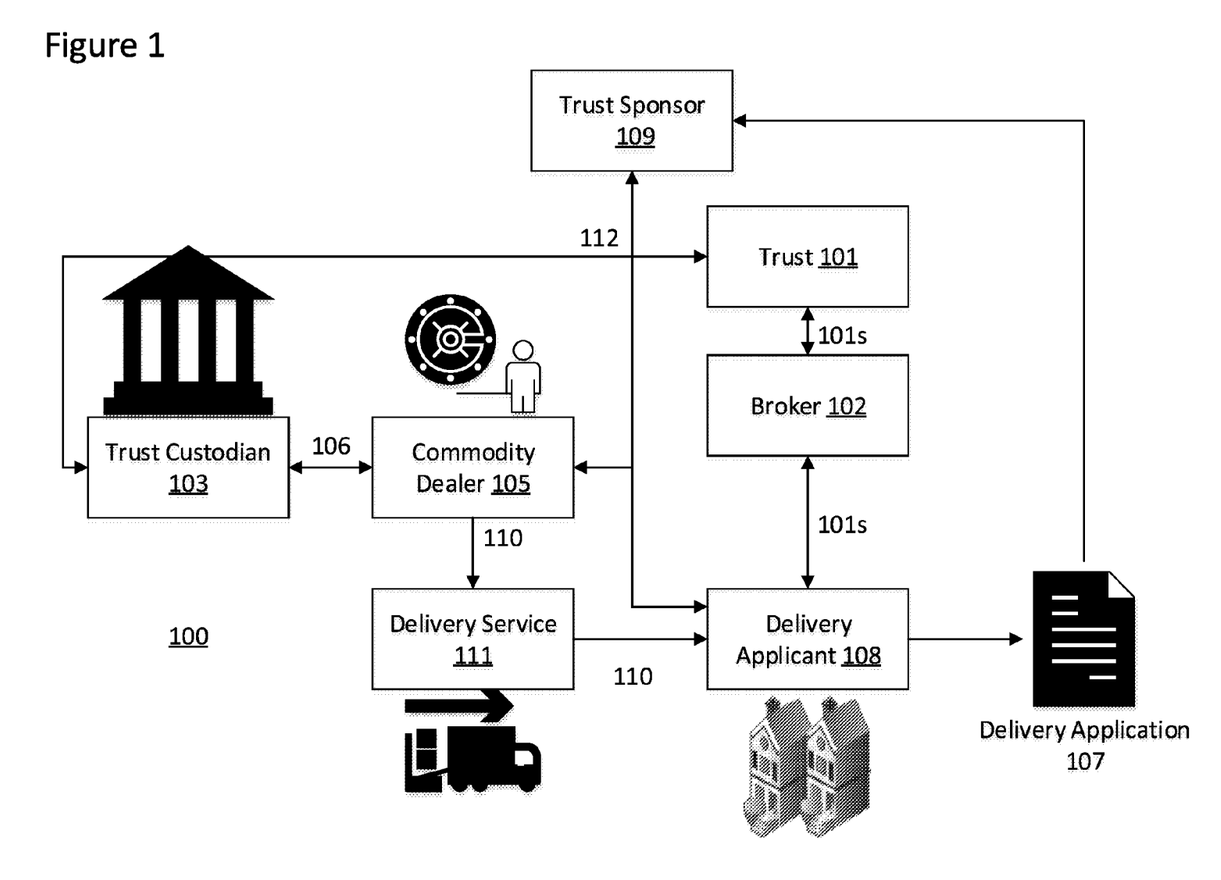
FIG. 1 illustrates a block diagram of a system for providing delivery of a precious metal to a delivery applicant shareholder that is in accordance with embodiments of the present invention.

FIG. 1 illustrates a block diagram of a system 100 for providing delivery of a commodity, for example gold, to a delivery applicant. The delivery applicant is a pro-rata investor in an investment vehicle. System 100 also enables a sponsor of the investment vehicle to collect an exchange fee. System 100 comprises trust 101. Trust 101 issue shares 101s in baskets of a predetermined amount in return for deposits of the commodity on which the investment vehicle is based; references to trust 101 herein, may refer to the trust's trustee as agent for the trust. Note that in the situation in system 100, the investment vehicle is an exchange traded fund utilizing a trust, but the investment vehicle could be any other type of registered or non-registered investment vehicle, as well as exchange traded or non-exchange traded vehicle. These include vehicles such as open-end or closed-end investment companies (also known as mutual funds and closed-end funds), commodity pools, exchange traded notes (ETNs), exchange traded products (ETPs), futures funds, derivative funds, fund of funds, limited or general partnerships, master-limited partnerships and any other legal construct capable of a serving as a potential vehicle for investment, including legal constructs that do not yet exist.

The shares 101s are generally issued to a broker 102. Although only one broker is shown, multiple brokers can be involved with system 100. Shares 101s are provided to broker 102 in response to broker 102 delivering a volume of a commodity and assuring that the commodity is deposited with a trust custodian 103 and held in a trust custodian account. The trust custodian 103 may be a large institutional commodity dealer such as an international bank or, in the case of gold, a bullion dealer capable of clearing transactions with the London Bullion Market Association (LBMA). The shares 101s that are provided to broker 102 represent an ownership interest in the trust. An asset of the trust is a supply of the commodity on which the investment vehicle is based. For example, the main asset could be a supply of gold held by trust custodian 103. Generally the commodity will be stored as a collection of physical units having a physical composition. Examples of physical units include barrels of oil, bars of gold, or bars of silver. Examples of a physical composition include West Texas Intermediate or London Good Delivery Bars. An exchange of shares 101s represent a transfer of the ownership of a portion of the commodity stored by trust custodian 103.

In the example where multiple brokers 102 compete with one another (or a single broker 102 has a contractual obligation), shares 101s can trade in the marketplace at very low spreads. This is because such brokers 102 compete for the business of a) retail investors buying and selling shares of the trust b) are able to receive new shares of trust 101 at the trust's net asset value in exchange for supplying commodities to the trust; and c) are able to hedge their own risk most efficiently because trust 101 holds a commodity in a composition that is readily hedged through market instruments. But, in addition to the efficiency and convenience described above, an investor and delivery applicant 108 in system 100 can file a delivery application 107 and take delivery of the commodity underlying the shares in different compositions. While there may be fees involved for delivery applicant 108 to exchange shares 101s for the commodity in physical form, delivery applicant 108 is able to purchase the shares through broker 102 easily and cost-effectively at a price that reflects the value of the commodity held by the trust, and then—on any business day in the future—have the choice to file delivery application 107 and take physical possession of the commodity in a format convenient to delivery applicant 108. Previously, it was not possible for retail investors to access both institutional efficiency, as well as the convenience of taking delivery of physical commodity of a composition that's tailored to the needs of such retail investor. As a concrete example, it is possible for the trust to hold London Good Delivery Bars that can be invested in easily and cost effectively through the trust, but investors may choose to take delivery of such gold in the form of, for example, American Gold Eagle coins.

Trust sponsor 109 is set to conduct over-the-counter (OTC) trades 106 with commodity dealer 105. These OTC trades exchange a first quantity composition of a commodity in the trust custodian account for a second quantity composition of the commodity with the same underlying commodity content. The first and second quantities of the commodity can have different physical compositions. For example, the first physical composition could be London Good Delivery Bars while the second composition could be American Gold Eagle Coins. In order for the OTC transaction to settle, trust custodian 103 delivers an agreed upon quantity of the commodity to the commodity dealer 105. Commodity dealer 105 forms an integral part of system 100. Commodity dealer 105 needs to be able to engage in a transaction with trust custodian 103, but may be a commodity dealer specializing in trading said commodity in compositions desirable in the retail market. Therefore, commodity dealer 105 provides a valuable service because trust custodian 103 may, for example, be an institutional service provider that is not able to serve the retail commodity market; and broker 102 may, for example, be a FINRA registered broker-dealer that is prevented by regulation from physically handling commodities such as gold. Commodity dealer 105 is therefore instrumental in allowing system 100 to provide a conversion capability to the associated investment vehicle.

Delivery application 107 allows a delivery applicant 108 to request delivery of a physical quantity of the commodity underlying the investment vehicle. The delivery application 107 may be allowed to be submitted on any business day. Delivery application 107 may allow a delivery applicant to specify a conversion specification that defines the physical composition of the commodity quantity 110 that delivery applicant 108 desires to receive. In examples where the commodity is gold, the commodity quantity 110 could take the format of London Good Delivery Bars. However, in other examples, the commodity quantity 110 will be of a format that is more desirable to retail investors such as standardized gold bars of a set purity and weight or gold coins minted by a national government. The availability of these various physical compositions is constrained by the types of physical compositions available to commodity dealer 105 to ensure prompt delivery of the commodity in return for surrendering shares to the Trust. Turning again to the example of gold as the commodity, the physical composition of the commodity as stored with the trust custodian 103 may be, as described previously, London Good Delivery Bars, and the physical composition of the commodity as requested by the delivery application 107 may be American Gold Eagle Coins. The benefit of this particular conversion is that the commodity changes from a composition that cannot be delivered to a retail investor by a common delivery service, nor to a residential address to one which is amendable to delivery by a common delivery service 111 to a delivery applicant's home address. An example of a common delivery service 111 includes FedEx or UPS. In contrast, London Good Delivery Bars can only be delivered by armored transportation and can only be delivered to trusted addresses, i.e. not to a residence.

The benefit of the conversion provided by commodity dealer 105 is illustrated by the following discussion. While the commodity is stored with trust custodian 103 it can be stored in a physical composition that trades close to the spot price of the commodity. Therefore, the investment vehicle retains valuable liquidity and transaction costs are decreased. At the same time, a retail investor such as delivery applicant 108 can obtain delivery of the commodity in a format for which they can serve as an adequate custodian and from which they can derive maximum value and security from physical ownership. It is only when the investor requests physical delivery that the investor incurs the additional costs of trading in physical formats of the commodity that are less amenable to large scale institutional trading.

Delivery application 107 may impose terms on how many shares are submitted to trust 101, so as to ensure that the shares submitted closely reflect the quantity of the underlying commodity; this is desirable so as to minimize the shares not corresponding to a full unit of the underlying commodity in the composition specified in the delivery application. In such cases, a cash component may be delivered reflecting the value of such commodity not delivered in kind. For example, if the trust custodian stored individual barrels of oil, the quantity that could be requested might be restricted to the value of any whole number of barrels of oil. Minimizing the cash component of a delivery request provides significant benefits, not least of which is that a delivery applicant is submitting shares because of a desire to receive the physical commodity. Minimizing the cash component to each transaction may also provide tax advantages.

Trust sponsor 109 arranges for the creation of trust 100. However, trust sponsor 109, for purposes of facilitating an exchange of shares of a delivery applicant 108 into physical commodity to be delivered, is merely an agent that never takes physical possession of the gold. This provides an additional benefit in that the anti-money-laundering (AML) responsibility of the investment vehicle remains at broker 102. Similarly, while commodity dealer 105 and trust custodian 103 may physically hold commodities, they are agents of the trust, not of the delivery applicant. The trust's responsibility ends when the physical commodity is handed over to delivery service 111. The system and process are therefore highly scalable because it retains AML responsibilities at broker 102, who has an established relationship with delivery applicant 108. As such, many delivery applicants 108 may file delivery applications 107 with their respective broker 102. The trust sponsor may receive a fee for administrating the system from the trust and may also collect a fee from delivery applicant 108 every time a delivery is requested. The trust sponsor 109 may also be in contact with trust 101, trust custodian 103, commodity dealer 105, and delivery applicant 108 via communications network 112. Note that communications network 112 is shown as a single element, but it can be multiple networks.

Figure 2:
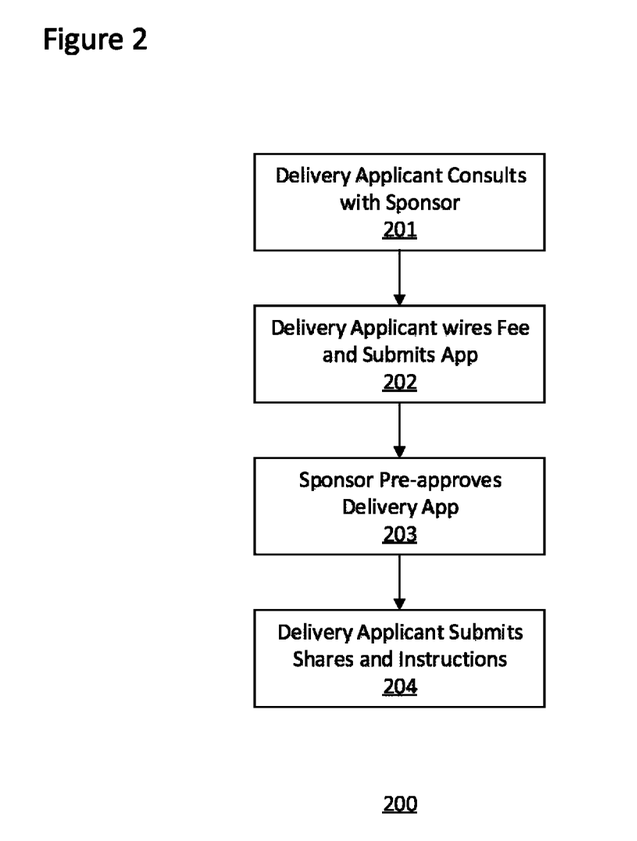
FIG. 2 illustrates a flow chart of a method of accepting and processing a delivery application that is in accordance with embodiments of the present invention.

FIG. 2 illustrates a method 200 of accepting and processing a delivery application. In step 201, a delivery applicant consults with a sponsor to determine the availability of various physical compositions of a commodity owned by the delivery applicant in an investment vehicle associated with the sponsor. In step 202, the delivery applicant completes a deliver application based on information received in step 201 and wires the processing or exchange fee to the sponsor along with the completed delivery application. In step 203, the sponsor pre-approves the delivery application and notifies the delivery applicant. In step 204, the deliver applicant irrevocably submits shares in the investment vehicle to an entity associated with the investment vehicle such as a trustee in the example where the investment vehicle is a trust. This submission of shares is conducted via the applicant's broker and employs industry-standard share submission processes as specified in delivery instructions.

Figure 3:
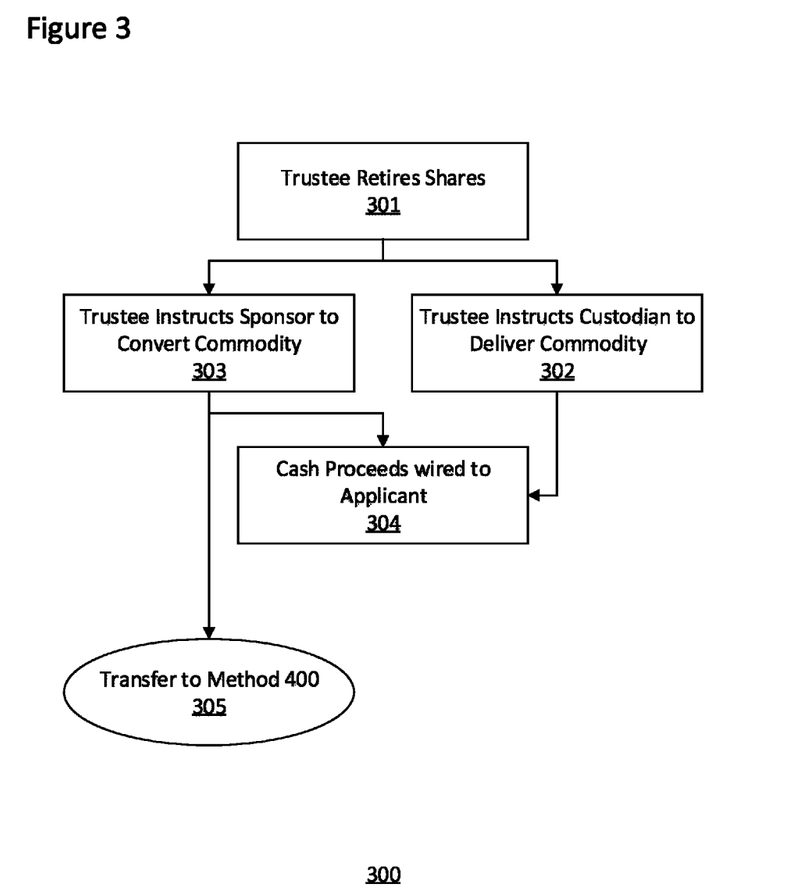
FIG. 3 illustrates a flow chart of a method of delivering a quantity commodity to a delivery applicant that is in accordance with embodiments of the present invention.
Figure 4:
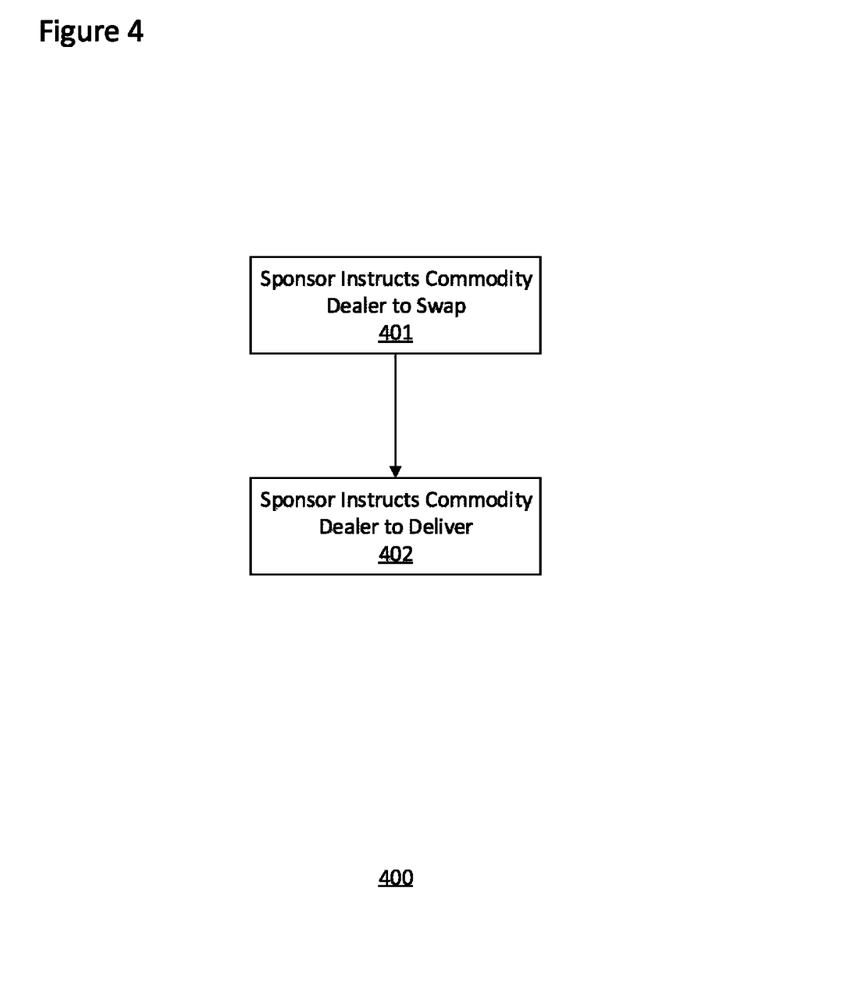
FIG. 4 illustrates a flow chart of a method of delivering a quantity of a commodity in a specified format to a delivery applicant that is in accordance with embodiments of the present invention.

FIG. 3 illustrates a method 300 of delivering a commodity to a delivery applicant. Step 301 can continue from step 204 in method 200. In step 301, an entity associated with the investment vehicle, such as a trustee in the example where the investment vehicle is a trust, retires the shares that were submitted with the delivery application in step 204. Depending on the content of the delivery application, method 300 will continue with step 302 or step 303. If the delivery application did not request a conversion of the commodity, method 300 continues with step 302 in which an entity such as the aforementioned trustee instructs a custodian to facilitate delivery of the commodity to the delivery applicant. In the situation of a gold backed investment vehicle, this step may include the delivery of London Good Delivery Bars to the delivery applicant from the custodian. If the delivery application did request a conversion of the commodity, method 300 continues with step 303 in which an entity such as the aforementioned trustee instructs a sponsor to facilitate the delivery of the commodity to the delivery applicant in a converted format. Step 303 will be followed by both steps 304 and a transition via link step 305 to method 400. Step 302 is followed by step 304. In step 304, cash proceeds are wired to the delivery applicant from an entity such as the trustee, or on behalf of the trustee by the custodian to balance the value of the shares submitted against the closest quantity of the commodity that could be delivered according to the delivery applicant's specification.

FIG. 4 illustrates a method 400 conducted by a sponsor to facilitate the delivery of a converted commodity to a delivery applicant. In step 401, the sponsor instructs a commodity dealer to swap a quantity of a commodity for an equal amount of the same commodity in the format specified by delivery application 107. To facilitate the transaction, custodian 103 transfers the commodity held on behalf of such aforementioned trust to the commodity dealer 105; such transfer may take place by the custodian 103 first converting the commodity into an unallocated commodity. In the example of gold, the custodian might convert allocated gold held on behalf of the trust into unallocated gold to be transferred to the commodity dealer to procure a gold coin or bar as specified in the delivery application. In step 402, the sponsor instructs the dealer to deliver the commodity specified in the delivery application to the delivery applicant. Referring back to method 300, it may be at this point that step 304 is executed.

Figure 5:
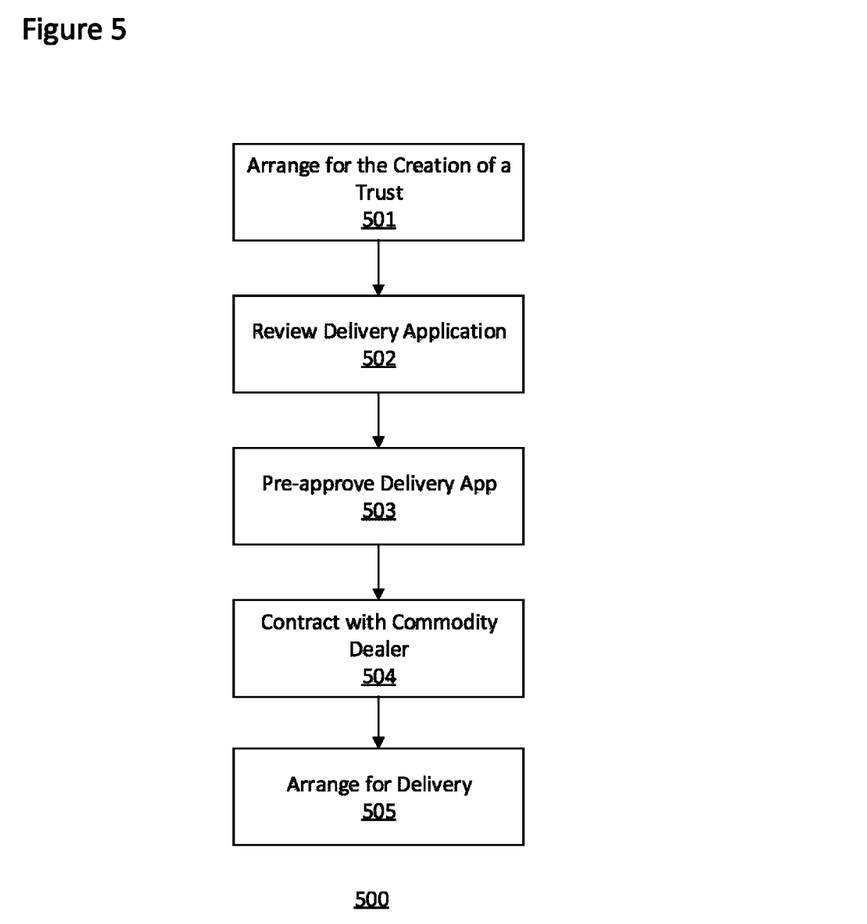
FIG. 5 illustrates a flow chart of a method conducted by a sponsor of a deliverable commodity investment vehicle that is in accordance with embodiments of the present invention.

FIG. 5 illustrates a method 500 conducted by a sponsor to facilitate the delivery of a converted commodity from a trust to a delivery applicant. In step 501, the sponsor arranges for the creation and registration of the trust. The trust comprises shares that reflect a performance price of the commodity less operating expenses of the trust. Shares of the trust are traded by brokers. In step 502, a delivery application provided by a delivery applicant is reviewed which contains a commodity delivery specification. In step 503, the sponsor pre-approves the delivery application. Step 503 may be conducted after confirming with a commodity dealer that a specified composition of the commodity meeting the delivery specification is available and reserved by the commodity dealer. In step 504, the sponsor contracts with the commodity dealer to fulfill the commodity delivery application. In step 505, the sponsor arranges for the delivery of the commodity as described in the delivery application. Method 500 requires a custodian to transact with the commodity dealer to convert the commodity stored by the trust in a custodian account into a different physical composition as specified in the delivery application. In certain embodiments, this is an integral part of steps 504 and 505.

The method described with reference to FIG. 5 could include additional steps. The sponsor can collect a fee from the delivery applicant. The fee could be collected from the delivery applicant as part of the delivery process. This step could be executed when the delivery application is received. The exchange fee could be set on a periodic basis prior to when the delivery application contacts the sponsor about a transaction. Therefore, the cost of the transaction can be determined ahead of time which can offer advantages, as all fees can be paid before shares are submitted. The sponsor could also appoint inspectors to monitor the accounts of the custodian. The sponsor could also instruct the precious commodity dealer to swap unallocated units of the commodity into a composition of the commodity as described in the delivery application. The sponsor could also notify the delivery applicant directly or via the broker when the delivery application is preapproved. The sponsor could impose terms on the number of shares to be specified in a delivery application which can offer advantages, such as minimizing the cash component of the transaction. Finally, the sponsor could impose terms on the delivery specification to minimize a cash component generated when delivery applicant 108 surrenders shares to the trust 101 to facilitate the exchange of shares for the physical commodity.

Although embodiments of the invention have been discussed primarily with respect to specific embodiments thereof, other variations are possible. Various configurations of the described system may be used in place of, or in addition to, the configurations presented herein. Those skilled in the art will appreciate that the foregoing description is by way of example only, and is not intended to limit the invention. Furthermore, nothing in the disclosure should indicate that the invention is limited to systems and methods that involve gold or precious metals as the invention is broadly applicable to other physical commodities such as oil, silver, copper, frozen orange juice, natural gas, and coal. In general, any diagrams presented are only intended to indicate one possible configuration, and many variations are possible. Those skilled in the art will also appreciate that methods and systems consistent with the present invention are suitable for use in a wide range of applications encompassing any related to investing in commodities and physical goods.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those skilled in the art, without departing from the spirit and scope of the present invention, which is more particularly set forth in the appended claims.

What is claimed is:

1. A system for providing delivery of a commodity to a delivery applicant shareholder comprising:

a trust for issuing shares, said shares representing an interest in said trust, and said trust owning a supply of said commodity;

a trust custodian account for storing at least a portion of said supply of said commodity, said supply having a first physical composition;

a commodity dealer account for conducting over-the-counter trades, said commodity dealer account being used in the conversion of a first quantity of said supply in said trust custodian account to a second quantity of said commodity in said commodity dealer account; and a delivery application form used by said delivery applicant shareholder to selectively define a conversion specification, said conversion specification defining a physical composition of said second quantity.

2. The system of claim 1, wherein:
said commodity is gold;
a physical composition of said first quantity is a London Good Delivery Bar; and
said physical composition of said second quantity comprises uniformly sized physical units.

3. The system of claim 2, wherein:
said delivery application imposes terms on the number of shares that may be submitted in return for said second quantity; and
said terms are selected to minimize a cash component of said over-the-counter trades.

4. The system of claim 1, further comprising:
a delivery service for transporting said second quantity of said commodity;
wherein said delivery service is capable of transporting said second quantity of said commodity to a residence of said delivery application shareholder.

5. The system of claim 4, further comprising:
a trust sponsor for arranging a creation of said trust;
wherein said trust sponsor never controls said shares, said supply, or said second quantity of commodity.

6. A system for receiving a fee for providing a conversion of a commodity comprising:
a supply of a commodity owned by an investment vehicle, said investment vehicle configured to be owned by a shareholder;
a sponsor for establishing said investment vehicle, collecting said fee, and receiving a delivery application;
a custodian for storing said supply of said commodity, said commodity stored as a collection of first physical units;
a commodity dealer specializing in trading said commodity, said commodity dealer having agreed to conduct trades with said sponsor, said trades converting a first quantity of said supply for a second quantity of said commodity; and
a broker dealer for trading shares of said investment vehicle;
wherein said delivery application is provided by said shareholder, and specifies a physical format for said second quantity of said commodity; and
wherein said fee is collected from said shareholder after said shareholder completes said delivery application.

7. The system of claim 6,
wherein said investment vehicle is a trust; and
wherein said system further comprising a trustee for issuing said shares in baskets in return for a quantity of said commodity.

8. The system of claim 7, wherein said sponsor never controls said shares, said supply, said first quantity of said commodity, or said second quantity of said commodity.

9. The system of claim 7, wherein:
a transfer of ownership of said shares constitutes a transfer of ownership of a corresponding collection of said first physical units, and
said shares are capable of representing ownership in a portion of one of said first physical units.

10. The system of claim 6, wherein said commodity is gold and said first physical units are London Good Delivery Bars.

11. The system of claim 10,
further comprising a trustee for issuing said shares;
wherein said trustee can alternatively instruct said custodian to deliver London Good Delivery Bars to said shareholder.

12. The system of claim 10, wherein:
said physical format of said second quantity has no numismatic value;
said delivery application places a restriction on said second quantity; and
said restriction is selected so that said second quantity must be divisible by a predetermined minimum quantity.

13. The system of claim 12, said minimum quantity is set by a minimum physically divisible quantity of said second quantity available to said commodity dealers on a given day.

14. A method comprising:
arranging for creation of a trust, said trust having shares that reflect a performance of a price of a commodity less operation expenses of said trust, said commodity being stored by a custodian, and said shares being traded by a broker;
reviewing a delivery application, said delivery application being provided by a delivery applicant and containing a commodity delivery specification;
pre-approving said delivery application;
coordinating with a commodity dealer to fulfill said commodity delivery specification; and
arranging for delivery of a customer commodity delivery to said delivery applicant, said customer commodity delivery matching said commodity delivery specification;
wherein after said pre-approving, said custodian transacts with said commodity dealer to convert said commodity to said customer commodity delivery.

15. The method of claim 14, further comprising:
collecting a fee from said delivery applicant; and
wherein said fee is set on a periodic basis, and prior to said delivery applicant contacting said sponsor regarding a transaction in which said fee will be paid.

16. The method of claim 14, wherein:
said custodian stores said commodity in the form of London Good Delivery Bars;
said customer commodity delivery is in a form of fixed-weight gold bars or gold coins.

17. The method of claim 16,
further comprising instructing said commodity metals dealer to swap unallocated gold into gold that meets said commodity delivery specification;
wherein a transfer of ownership of said shares consists of a transfer of ownership of said London Bars.

18. The method of claim 14, further comprising:
restricting a submission quantity of said shares to minimize a cash component generated when said shares are exchanged for said customer commodity delivery; and
notifying said delivery applicant that said delivery application has been pre-approved.

19. The method of claim 18, wherein said customer commodity delivery is a liability for said trustee during delivery.

20. The method of claim 18, wherein said delivery can be to a residence of said delivery applicant.

* * * * *